United States Patent

Cauquot et al.

[11] Patent Number: 5,837,073
[45] Date of Patent: Nov. 17, 1998

[54] TIRE-RIM ASSEMBLY FOR HEAVY VEHICLES WITH SPECIFIED RIM FLANGE STRUCTURE

[75] Inventors: Georges Cauquot, Gerzat; Guy-Noël Lambert, Clermont-Ferrand; Guy Ott, Chamalieres, all of France

[73] Assignee: Compagnie Générale des Etablissements Michelin—Michelin & Cie, Clermont-Ferrand Cedex, France

[21] Appl. No.: 778,241

[22] Filed: Jan. 8, 1997

[30] Foreign Application Priority Data

Jan. 15, 1996 [FR] France ................................. 96 00519

[51] Int. Cl.⁶ ........................... B60B 21/02; B60B 21/10; B60C 3/04; B60C 9/00
[52] U.S. Cl. ........................... 152/158; 152/454; 152/520; 152/521; 152/539; 152/544; 152/555; 152/375; 152/378 R; 301/95; 301/97
[58] Field of Search ..................... 152/454, 158, 152/520, 375, 378 R, 379.3, 379.4, 379.5, 381.3, 402, 403, 404, 405, 555, 521, 539, 544; 301/95, 96, 97, 98

[56] References Cited

U.S. PATENT DOCUMENTS

| | | | |
|---|---|---|---|
| 2,367,825 | 1/1945 | Shaw | 152/520 X |
| 3,895,667 | 7/1975 | Mitchell | 152/405 X |
| 3,910,336 | 10/1975 | Boileau et al. | |
| 4,029,139 | 6/1977 | Abbott | |
| 4,274,466 | 6/1981 | French et al. | 152/381.3 |
| 4,641,670 | 2/1987 | Poque et al. | 152/158 |
| 4,658,876 | 4/1987 | Augier | |
| 4,840,213 | 6/1989 | Koseki | 152/454 |

FOREIGN PATENT DOCUMENTS

| | | | |
|---|---|---|---|
| 24 32 927 | 1/1976 | Germany | 152/520 |
| 24 38 632 | 3/1976 | Germany | 152/378 R |
| 26 45 760 | 4/1978 | Germany | 152/379.3 |
| 3626123 | 2/1988 | Germany. | |
| 8702348 | 9/1988 | Germany. | |
| 2 154 519 | 9/1985 | United Kingdom | 152/379.4 |

Primary Examiner—Adrienne C. Johnstone
Attorney, Agent, or Firm—Baker & Botts, L.L.P.

[57] ABSTRACT

A rolling assembly is formed of a tire P with radial carcass reinforcement (1), the equilibrium curve of the thickness center line of which is tangent to the bead cores (2), and of a rim J comprising, axially to the outside of each seat (20) a flange R formed of a frustoconical portion (23) having a generatrix forming an angle of between 20° and 60° with a direction parallel to the axis of rotation, which is connected axially to the inside to the rim seat by an S-shaped portion and which is extended axially towards the outside by a cylindrical portion (25), in its turn extended by the curved end (26), the rim J having an axial width A equal to at most 0.65 times the maximum axial width S of the tire mounted on its rim and inflated to its pressure of use.

10 Claims, 3 Drawing Sheets

TIRE-RIM ASSEMBLY FOR HEAVY VEHICLES WITH SPECIFIED RIM FLANGE STRUCTURE

BACKGROUND OF THE INVENTION

The present invention relates to a rolling assembly formed of a rim and a tire of the "heavy vehicle" type on the inside of which there may possibly be placed a tread supporting device, this assembly being intended for travel with a pressure which may be low or zero. It also relates to the rim itself.

Certain conditions of travel, and in particular so-called "all terrain" travel, on surfaces of any kind, with obstacles of both different nature and different size strewn thereon make these assemblies very fragile due to lack of resistance to fatigue at low pressure, in particular of the tire of said assemblies, which lack of resistance to fatigue manifests itself, on the one hand, in failings of the sidewalls and/or the beads of the tire at the level of the point of the juncture with the bead cores and the crown and, on the other hand, in failings of the sidewalls due to aggressive influences, such as impacts, perforations, and pinching caused by the presence of various objects on the ground.

In order to preserve the flexibility of a tire for a passenger car, French Patent 2 224 313 recommends an assembly formed of a radial tire, the carcass reinforcement of which has a thickness center line, the natural equilibrium curve of which is tangent to the bead cores, and of a mounting rim the flange of which is formed of an S-shaped portion axially extending the rim seat to the outside, said portion being axially and radially extended to the outside by a frustoconical portion, the inclination of the frustoconical generatrix being 20° and 60° and substantially parallel to the segment located opposite the thickness center line of the carcass reinforcement. A cylindrical inward curvature axially terminates the flange on the outside.

SUMMARY OF THE INVENTION

In order to improve the resistance of the tire, the rolling assembly of the invention, which is formed of a tire with a radial carcass reinforcement, the equilibrium curve of the thickness center line of which is tangent to the bead cores, and of a rim comprising axially to the outside of each seat a flange formed of a frustoconical portion having a generatrix forming an angle of between 20° and 60° with a direction parallel to the axis of rotation, connected axially to the inside by an S-shaped portion and having axially to the outside a curved end, is characterized by the fact that, seen in meridian section:

- the tire is mounted on a rim the axial width A of which is equal to at most 0.65 times the maximum axial width S of the tire, inflated to its pressure of use,
- the mounting rim has, on both sides of the equatorial plane, a flange the frustoconical portion of which is extended axially to the outside by a cylindrical portion which in its turn is extended by the curved end,
- the height of said flange H being reduced as compared with the height of the flange of a standard rim of the same axial width A and being a linear function of said width A, namely a function of the form H=a·A, in which a is between 0.105 and 0.115.

In the case of the tire in accordance with the invention which is intended for travel on surfaces of highway type as well as "off-the-road", there is understood by pressure of use the pressure recommended for travel on a road, which pressure may be in fact greatly decreased in the case of travel "off the road". Likewise, by cylindrical portion there is to be understood a portion the generatrix of which forms an angle of between +5° and −5° with a parallel to the axis of rotation.

Preferably the axial width A will be at most equal to 0.60 times the maximum axial width S of the tire.

The cylindrical portion will advantageously have an axial width at least equal to the axial width of the frustoconical portion, and the sum of these widths will be between 10% and 20% of the width A of the rim.

Each frustoconical portion of the rim is connected to each rim seat by an S-shaped curve, the arms of which may be of different length and curvature. This S-shaped connecting curve preferably has one circular branch tangent to the bead seat and the other circular branch, of the same radius, tangent to the frustoconical portion of the flange. The junction of the frustoconical portion with the cylindrical portion is preferably effected by a connecting radius greater than the common radius of the circular branches of the S-shaped portion, and advantageously between 8 and 12 mm, which permits a better evolution of the meridian profile of the carcass reinforcement in the case of travel with zero or low pressure.

In most cases of use, it will be sufficient that the width of the cylindrical portion be equal to the width of the frustoconical portion, the widening of said cylindrical portion beyond this value not making it possible to improve the performance/price ratio.

As known per se, the tire will advantageously have each of its sidewalls provided on the inside, between the meridian profile of the carcass reinforcement and the inner liner of rubber which is impermeable to the inflation gases, with a reinforcement of rubber mix in the shape of a crescent, the thickness of said reinforcement being zero in the region of the beads substantially at the level at the points of tangency of the carcass reinforcement with the bead cores, zero in the overhead zone substantially at the level of the ends of the crown reinforcement, and maximum approximately at the level of the maximum axial width of the carcass reinforcement so as to reach a value which may be between 3 and 6 mm.

It is furthermore advantageous for the tread of the tire to have an axial width at least equal to 0.8 times the maximum axial width S of the tire inflated to its normal pressure of use.

DESCRIPTION OF THE DRAWINGS

The invention will be better understood from the following description read with reference to the drawing which shows, by way of illustration and not of limitation, one embodiment, and in which.

DESCRIPTION OF PREFERRED EMBODIMENTS

Figure 1:
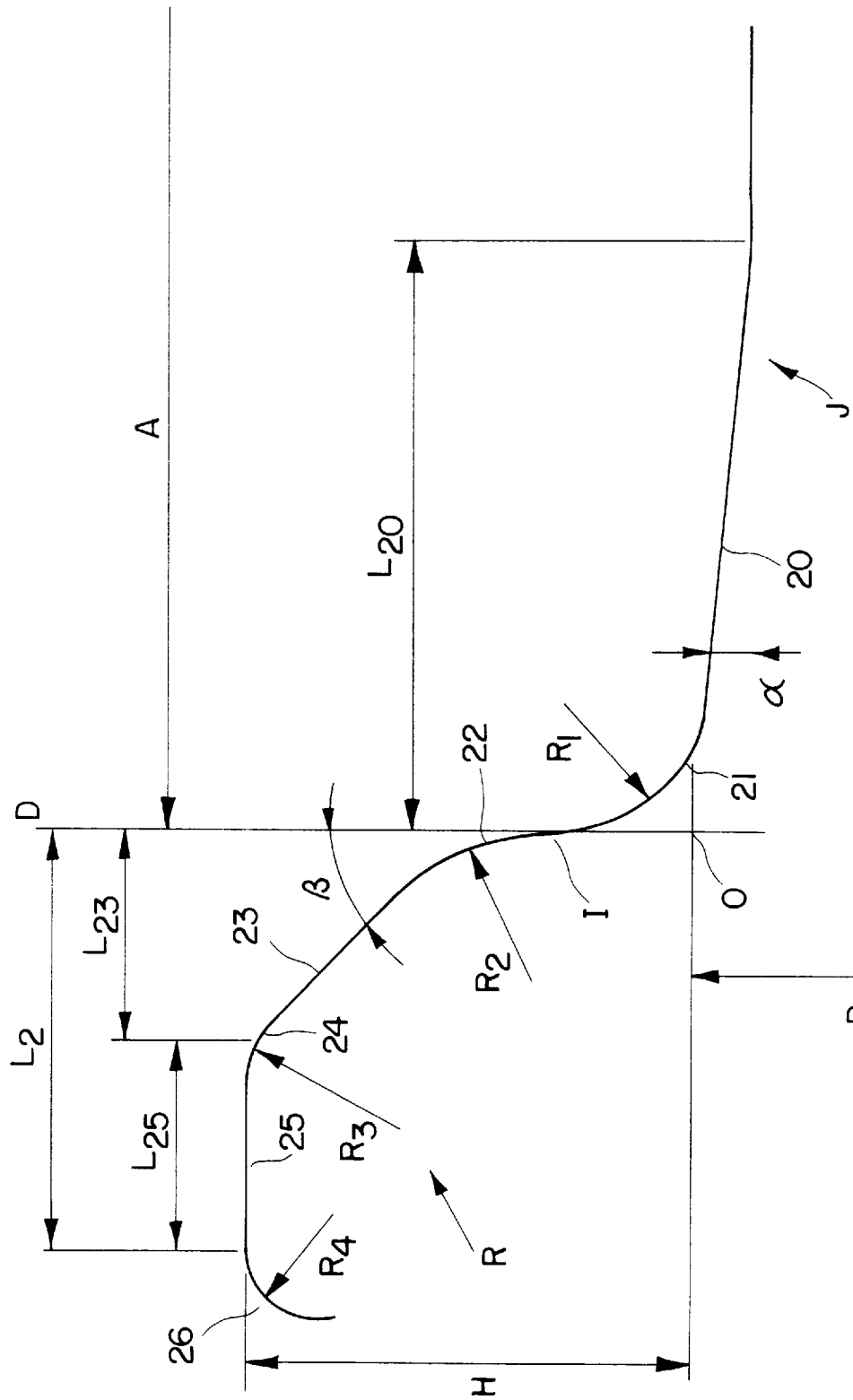
FIG. 1 shows diagrammatically, in meridian section, the radially outer meridian profile of the rim used for the assembly.
Figure 2:
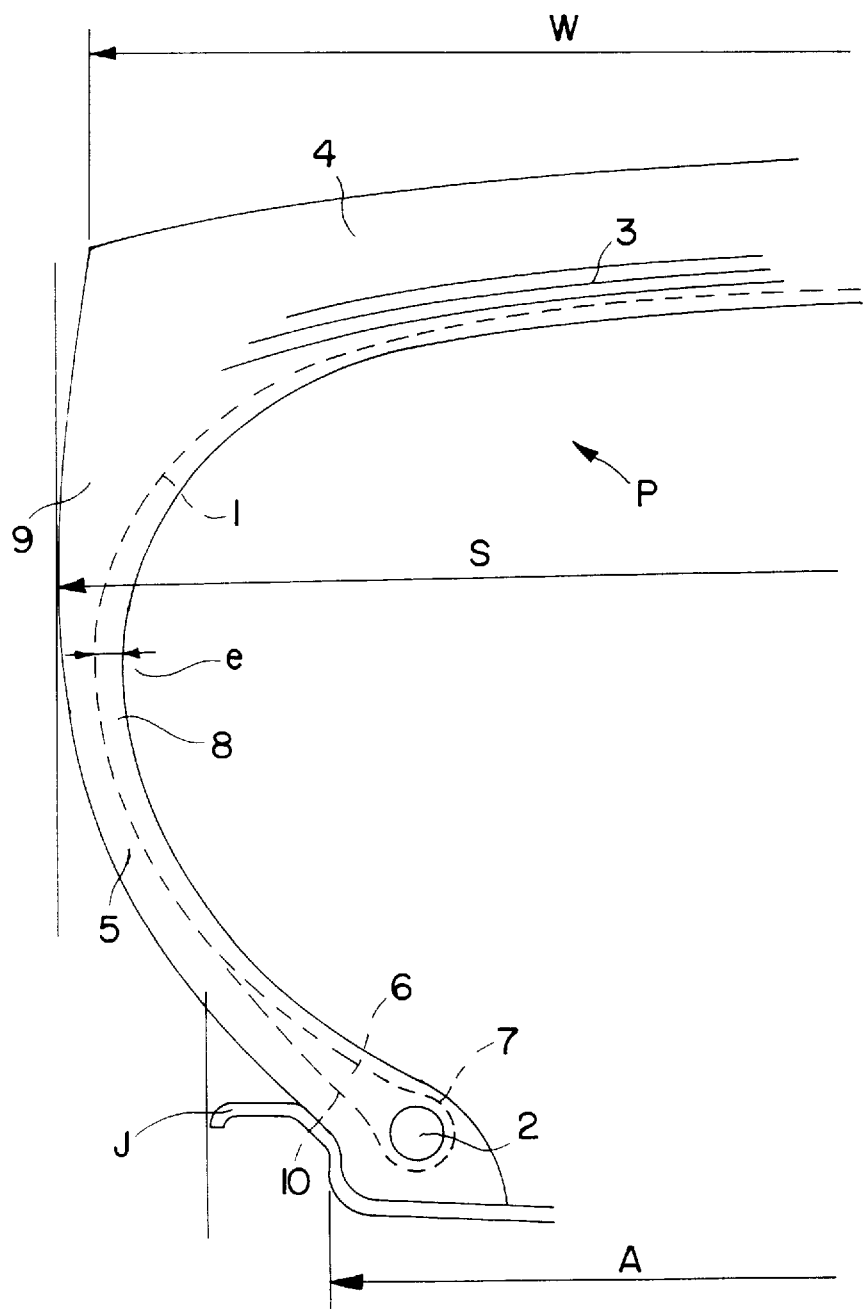
FIG. 2 shows diagrammatically the assembly formed by the rim of FIG. 1 and a tire adapted to said rim.

The meridian profile of the 9.00-27 rim J in accordance with the invention, which profile is symmetrical with respect to the equatorial plane (not shown) of the assembly (FIG. 1), comprises on each side of said plane a frustoconical rim seat 20 the generatrix of which forms an angle α of 5°±1° with the direction of the axis of rotation. The seat 20 of width $L_{20}$, equal to 36 mm, is extended axially to the outside by a convex circular rounding 21 of radius $R_1$ equal to 8 mm. Said rounding 21, together with a second concave rounding 22 of a radius $R_2$ also equal to 8 mm, forms the connecting portion S of the seat 20 with the frustoconical portion 23. The two roundings 21 and 22 are tangent to each other at the point of inflection I, through which point I there passes a straight line D perpendicular to the axis of rotation. This straight line D forms a point of intersection O with the generatrix of the seat 20. By convention, the axial width A of the rim J is the axial distance between the two points O on both sides of the equatorial plane, equal to 228.6 mm (9") in the case described. Likewise, this point O is the reference point for the measurement of the nominal diameter $D_J$ of the rim J, equal to 685.8 mm (27"). Axially extending the second rounding 22 to the outside and tangent to said rounding, the frustoconical portion 23 has a generatrix which forms an angle β of 45° with the straight line D. This frustoconical portion 23 is also tangent to the rounding 24 which extends it in axial direction to the outside, of a radius $R_3$ equal to 10 mm in the example shown, which rounding 24 assures the junction with the cylindrical portion 25 the generatrix of which is parallel to the axis of rotation. The rim flange R is then terminated axially to the outside by a circular end 26 of radius $R_4$ of 4 mm, tangent to the generatrix 25. The axial width $L_{25}$ of said cylindrical generatrix, measured between the point of tangency with the hook 26 and the point of intersection of said generatrix 25 with the frustoconical generatrix 23, is equal to 12 mm, while the axial width $L_{23}$ of the frustoconical generatrix 23, measured between the point of intersection of said generatrix 23 with the generatrix 25 and the point of said intersection of the generatrix 23 with the straight line D, is also equal to 12 mm. The sum of these two widths $L_2$ is then equal to 10.5% of the width A of the rim J. As to the height H of the rim flange, it is less than the corresponding height of a standard rim of the same width equal to 25.4 mm. Said value is obtained from the linear function H=0.1111A, while the function giving the height of the flange of a standard rim (ETRTO) with flat seat inclined at 5° with respect to the width of the rim can be written H~0.201A+2.32 which, for the same width of rim A, gives a height H of 48.3 mm.

The 405/80 R 27 tire P comprises a radial carcass reinforcement 1 and a crown reinforcement 3 surmounted by a tread 4. The thickness center line of the meridian profile of the carcass reinforcement 1, formed of a single ply of metal cords, is tangent at the point 7 to the bead core 2 and winds around it to form a turn-up 10. By thickness center line of a single ply of radial cords, seen in meridian section, there is to be understood the axis of symmetry of a cable of such ply. Between the turn-up 10 and the carcass ply 1, and the bead core 2 is surmounted, as is customary, by a bead apex 6 of rubber of substantially triangular shape. The meridian profile of the carcass reinforcement 1 radially above the point of tangency 7 is substantially parallel to the meridian profile of the frustoconical portion 23 of the mounting rim J and then extends radially until tangent to the meridian profile of the crown reinforcement 3, formed of two working plies of metal cords crossed from one ply to the next, forming with the circumferential direction angles which may be between 10° and 45° and of a protective ply of so-called elastic cords.

The carcass ply 1 is covered on the outside by the sidewall rubber 5 and is protected axially towards the inside by a sidewall insert of rubber 8 in the shape of a crescent. This inner reinforcement, the thickness e of which is maximum at the level of the maximum axial width of the carcass ply and equal to 4.5 mm, becomes zero at the junctions with the meridian profile of the crown reinforcement 3 and with the bead core 2, respectively, permits, in combination with the tension of the carcass ply 1 (under the effect of the inflation pressure) which is decreased as compared with the tension of the carcass ply of a standard tire, better protection of the sidewalls 9 from blows, punctures, cuts and their consequences, and particularly the degradation of the underlying carcass ply 1. A width W of tread equal to 0.95 times the maximum axial width S completes the above characteristics so as to improve the resistance of the sidewalls of the tire.

The ratio of the width A of the rim J to the maximum axial width of the tire S is equal to 0.56, which results in a length of sidewall far greater than that of a standard tire, and accordingly a definitely improved running life under low pressure. This improvement seems to be due, according to the applicant, to the fact that the meridian profile of the carcass reinforcement 1, in the region between the point of tangency 7 with the bead core 2 and the tip of the profiled member 6, above the bead core 2, radially furthest from the axis of rotation is not positioned beyond the straight line which is substantially parallel to the equatorial plane, this straight line containing the tip of the rim J furthest axially from said plane; as the rim flange R comprises, after the frustoconical portion 23, a cylindrical or quasi-cylindrical portion 25, it permits such a structure.

Figure 3:
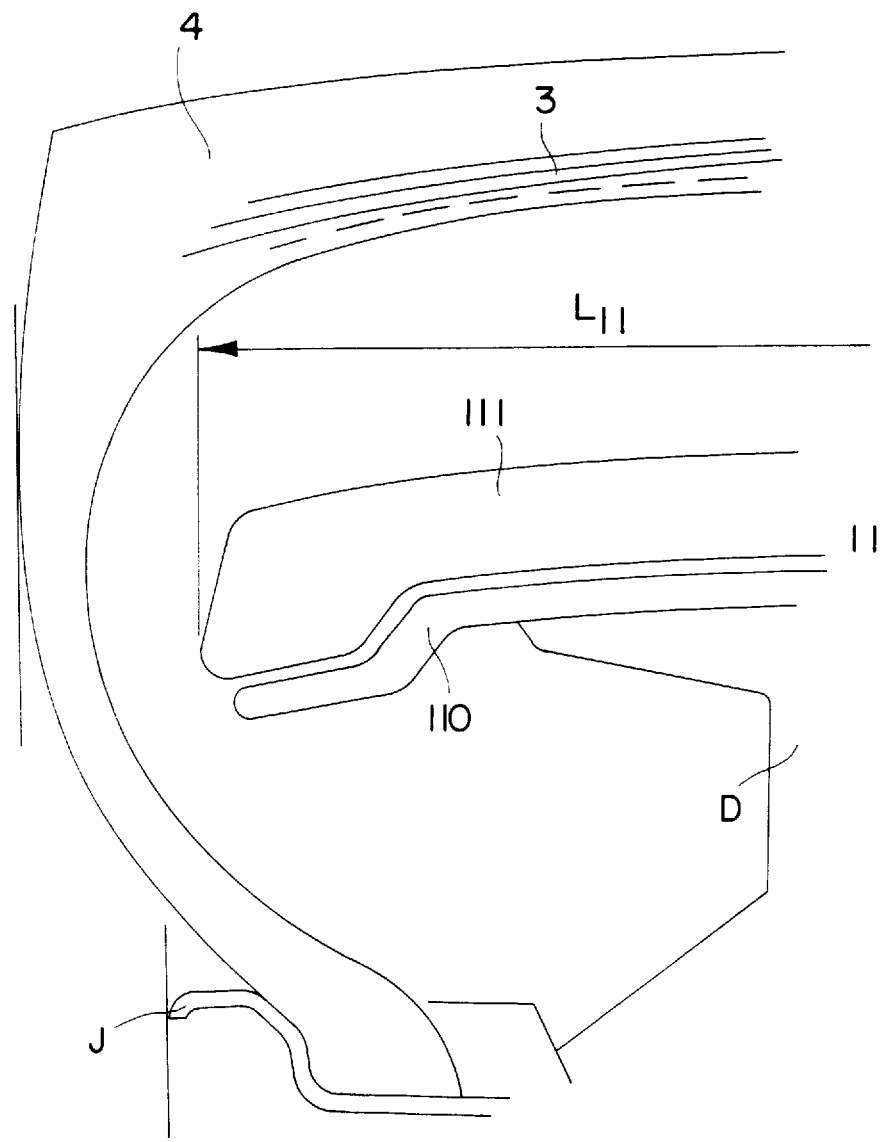
FIG. 3 shows diagrammatically the assembly of FIG. 2 in which a device for supporting the tread is inserted.

The assembly consisting of the tire P and rim J thus constituted is provided with a tread supporting device which may be any whatsoever, ranging from a "rubber foam core" to a multipartite metallic supporting ring. Preferably, the supporting ring 11 used (FIG. 3) will be formed of two materials, in particular a metallic support 110 on which a rubber cap 111 can turn freely by means of a lubricant. Such a device 11 is described in French application 2 707 923. In the use in question, employing a narrow rim J as compared with the maximum axial width S of the tire, the support ring 11 may have a rubber cap 111 having a maximum axial length $L_{11}$ equal to at least 0.9 times the maximum axial width of the rim J (axial distance between the two points of the rim axially furthest from the equatorial plane), which, when traveling on rough ground at low or zero pressure, in which case the tread rests on the support ring, permits good protection of the rim J from blows and pinching without, however, excessively penalizing the tread 4.

We claim:

1. A rim J characterized by the fact that it has, on each side of the equatorial plane, axially to the outside of each seat (20), a flange R formed of a frustoconical portion (23) having a generatrix forming an angle of between 20° and 60° with a direction parallel to the axis of rotation, connected axially towards the inside to the rim seat (20) by an S-shaped portion and extended axially to the outside by a cylindrical portion (25), in turn extended by a curved end (26), said cylindrical portion (25) having an axial width $L_{25}$ at least equal to the axial width $L_{23}$ of the frustoconical portion (23), and the sum $L_2$ of these widths being between 10% and 20% of the axial width A of the rim, the height H of the said flange R being reduced with respect to the height of the flange of a standard rim of the same axial width A, and being a linear function of said width A, of the form H=a·A, with a being between 0.105 and 0.115.

2. A rim according to claim 1, characterized by the fact that the cylindrical portion (25) has a maximum width $L_{25}$ equal to the axial width $L_{23}$ of the frustoconical portion (23).

3. A rolling assembly formed of a tire P with sidewalls (9), beads each with a bead core (2) therein, a crown region with a crown reinforcement (3) therein, a tread (4) and radial carcass reinforcement (1), the equilibrium curve of the thickness center line of which is tangent to the bead cores (2), and of a rim J comprising axially to the outside of each seat (20), a flange R formed of a frustoconical portion (23) having a generatrix forming an angle of between 20° and 60° with a direction parallel to the axis of rotation, which portion is connected axially towards the inside to the rim seat by an S-shaped portion and having axially to the outside a curved end (26), the rolling assembly characterized by the fact that, seen in meridian section, the tire P is mounted on rim J the axial width A of which is at most equal to 0.65 times the maximum axial width S of the tire inflated to its pressure of use, on both sides of the equatorial plane, the frustoconical portion (23) is extended axially to the outside by a cylindrical portion (25), itself extended by the curved end (26), the height H of said flange R is reduced as compared with the height of the flange of a standard rim of the same axial width A and is a linear function of said width A, of the form H=a·A, with a being between 0.105 and 0.115.

4. An assembly according to claim 3, characterized by the fact that the axial width A of the rim is at most equal to 0.60 times the maximum axial width S of the tire.

5. An assembly according to claim 3, characterized by the fact that the cylindrical portion (25) has an axial width $L_{25}$ at least equal to the axial width $L_{23}$ of the frustoconical portion (23), the sum $L_2$ of these widths being between 10% and 20% of the axial width A of the rim.

6. An assembly according to claim 3, characterized by the fact that the junction of the frustoconical portion (23) with the cylindrical portion (25) is effected by a connecting radius $R_3$ which is greater than the common radius $R_1$, $R_2$ of the circular branches of the S-shaped portion which connects the frustoconical portion (23) to the rim seat (20).

7. An assembly according to claim 6 characterized by the fact that the connecting radius $R_3$ is between 8 and 12 mm.

8. An assembly according to claim 3, characterized by the fact that the tire P has each side wall (9) provided on the inside, between the meridian profile of the carcass reinforcement (1) and an inner liner of rubber which is impervious to the inflation gases, with a reinforcement of rubber mix (8) in crescent shape, the thickness e of said reinforcement being zero in the region of the beads substantially at the level of the points of tangency (7) of the carcass reinforcement (1) with the bead cores (2), zero in the crown region substantially at the level of the ends of the crown reinforcement (3), and maximum approximately at the level of the maximum axial width of the carcass reinforcement (1) in order to reach a value which is between 3 and 6 mm.

9. An assembly according to claim 8, characterized by the fact that the tread (4) of the tire P has an axial width W at least equal to 0.8 times the maximum axial width S of the tire inflated to its normal pressure of use.

10. An assembly according to claim 3, characterized by the fact that it comprises furthermore a tread-supporting device (11) formed of a metal support (110) on which a rubber cap (111) can turn freely by means of a lubricant, said cap having a maximum axial width $L_{11}$ equal to at least 0.9 times the maximum axial width of the rim J.

* * * * *